— 3,446,892 —
IMMOBILIZING INSECTS BY SUDDEN REDUCTION OF BODY TEMPERATURE
Daniel M. Stout, St. Louis, Mo., assignor to Whitmire Research Laboratories, Inc., St. Louis, Mo., a corporation of Missouri
No Drawing. Filed Sept. 18, 1963, Ser. No. 309,853
Int. Cl. A01n 17/02; A61d 7/04; A01k 59/00
U.S. Cl. 424—45      4 Claims

ABSTRACT OF THE DISCLOSURE

Aerosol means to immobilize flying insects, such as wasps, by wetting them with a projected stream of highly volatile liquid, whereby the insects' body temperature is suddenly reduced by the vaporization of the liquid.

---

The present invention pertains generally to the annihilation of insects, and particularly to immobilizing distant insects.

Heretofore a great variety of insecticides have been prepared and have had great commercial acceptance for repelling, annihilating and poisoning insects. However, it has long been recognized that considerable time elapses after an insect has been contacted with insecticide and before it is rendered immobile or otherwise incapable of attack upon its victim. Take, for example, the case of a wasp which has been disturbed or otherwise so infuriated as to induce him to attack, he makes a "beeline" for his victim, and if, in the course of his flight, he is enshrouded with a contact insecticide, his flight is not interrupted, but, on the contrary, continues toward his target, and his sting is uninhibited even though he may die within seconds thereafter.

It is therefore an object of the present invention to provide a self-energized product and method of applying it whereby insects may be rendered immobile and incapable of attack, or their attack intercepted in flight at a substantial distance from their intended victim.

Other objects will be readily apparent to those skilled in the art from the following detailed disclosure.

Generally stated, the invention contemplates immobilizing insects by long distance refrigeration, suffocation and paralysis. This immozilization is accomplished by projecting, in the direction of an attacking insect, or a distant nest of insects, a projectile stream of liquid composition which is highly volatile, but whose volatilization is suppressed, so that it may travel as a liquid stream through the atmosphere for a measurable interval of time, while retaining a substantial vaporization potential under the ambient conditions. The particular time interval is more readily understandable if related to distance between the source of the projectile liquid stream and the target insects. If the stream maintains its liquid state for a distance of four feet or more, but substantial vaporization of it takes place beyond that distance, the refrigerating action involved in the change of state will so reduce the body temperature of an insect contacted by the liquid stream that the insect will be rendered incapable of attack at a safe distance from the intended victim. Contact with the vaporizing liquid reduces the body temperature of the insect below its point of activity and tends to freeze it, the fumes providing suffocation. The distance between the source and the insect may be almost any distance within reason, but depends upon a number of variables, including the composition of the liquid (boiling point, latent heat of vaporization, vapor pressure), the magnitude of the propelling force, the character of the nozzle through which it is propelled, and the ambient temperature of the atmosphere through which it is propelled.

The liquid composition must be one in which at least a substantial volumetric part does not change state (from liquid to gas) instantaneously upon sudden release from pressure, but does change state within milli-seconds after such release; and the objective is to delay such change of state until the projectile liquid has traveled from the point of pressure release into the environs of the insects, a substantial distance away from the point at which the pressure is released. This is accomplished by coordinating antithetical physical phenomena. With any given projectile liquid composition, the distance between the point of release from pressure and the locus of evaporation (hereinafter called the "evaporation range") decreases as the propellant pressure increases, and decreases as the area of the orifice through which it is released decreases. On the other hand, the distance which a given increment (liquid or gas) of the projectile stream travels in a relatively straight trajectory (hereinafter called "stream range") increases as the propellent pressure increases, and increases as the area of the orifice decreases.

It is preferable, but not necessary, to include within the projectile liquid composition effective amounts of contact insecticides, thereby providing the added insurance of ultimate kill, rather than the possibility that the insect, once immobilized by the refrigerating action of the evaporating liquid stream, may recover from the stunning effect. The method of the present invention is adapted for use with either internally or externally energized pressure systems. The internally energized systems are exemplified by so-called "aerosol bombs," and other containers which depend upon vaporization of liquid within them to create and maintain propelling pressures. Such arrest of an insect's attack at a safe distance dictates that the pressurized liquid be projected from the pressure chamber through a nozzle which squirts a stream rather than atomizes or disperses. Preferably, the nozzle has an unbaffled and otherwise unobstructed bore.

It is generally preferred to provide a liquid composition which will at least partially vaporize under atmospheric pressure at temperatures of 35–45° F. ±5°. That is the temperature at which the majority of insects become inactive. Flying insects, such as wasps, still maintain their flying ability at about 47–50° F. Below this temperature, their wing movements are impaired, although they still maintain some ability to crawl. However, a reduction of their temperature to substantially within the aforesaid temperature range negatives all appendage movement.

Liquids having the desired delayed vaporization and evaporation range can be obtained by mixing mutually soluble liquids having different boiling points and making use of azeotropic characteristics. For example, it is well known that mixtures of two liquids in a certain ratio will boil at a temperature which, in some instances, is less than the boiling points of either of the liquids. By using the principle of azeotropic mixtures, a large number of hydrocarbons, particularly low viscosity halogenated hydrocarbons, can act as vaporization temperature regulants for the volatile liquids. In applying the present invention with internally energized pressure systems, the propellant liquid (which generates gas within the container) may be any of those commonly used and known to the industry, so long as two primary considerations are kept in mind; first, that a vaporization deterrent is combined with the propellant, or other low-boiling component, to retard vaporization (under atmospheric pressure) until the desired evaporation range is reached, and then to produce a temperature within the range of insect inactivity; and second, to maintain a balance of propellant between enough to provide sufficient pressure to project the liquid the desired stream range versus the maintenance of substantial vaporization capability under ambient conditions of the liquid at that range. If these primary considerations are coordinated, the choice of liquids is vast.

Although the preferred vaporization delay lies within the previously stated range, there are instances where a slower vaporization will serve to accomplish the same end result, namely, immediately immobilize or kill the insect. In cases where the liquid composition has a more delayed evaporation, and the insect comes into contact with the liquid composition, evaporation of the latter will have a tendency to suffocate or paralyze the insect concurrently with or prior to the time the chilling action has taken its toll. To exemplify the suffocation and paralysis aspect, take for example, the case where an insect is exposed to liquid chloroform, isopropyl alcohol or perchloroethylene; suffocation is substantially simultaneous with initial contact. The chilling action and suffocation-paralysis are both prevalent in the compositions within the purview of this invention. In the majority of situations, both actions occur substantially simultaneously, and their result is dependent upon the immediate impact of these properties upon the insect.

Some volatile liquids which have been found applicable in the present compositions include: halogenated hydrocarbons, such as, dichlorotetrafluoroethane, trichloromonofluoro methane (Freon 11), trichlorotrifluoroethane and dichloro fluoro methane; and halogenated hydrocarbons, such as, methyl chloride, vinyl chloride, dichloro difluoromethane (Freon 12), chlorodifluoromethane, chlorotrifluoro methane, bromo trifluoro methane. Because of its relatively high vapor pressure (70.192 p.s.i.g. at 70° F.), dichloro difluoromethane is primarily used as the propellant for internally energized pressure systems, but some remains in azeotropic combinations at the evaporation range. Other propellants which may be used are propane, isobutane, n-butane, carbon dioxide, air, nitrogen and nitrous oxide.

The vaporization deterrents which have been found particularly applicable include halogenated hydrocarbons, such as 1,1 dichloro ethylene, isopropyl chloride, methylene chloride, n-propyl chloride, chloroform, carbon tetrachloride, ethylene dichloride, trichloroethylene, methyl chloroform, propylene dichloride, 1,1,2 trichloroethane, perchloroethylene, tetrachloroethane and monochlorobenzene; petroleum distillates, such as light and heavy fuel oils, kerosene, gas oil, naphthas and naphthalenes; but the invention is not limited thereto.

In the interest of maximum stream range, consistent with minimum flare or scatter, it is desirable that the liquid composition have a viscosity not substantially greater than that of kerosene oil.

As insecticide additives, the following compositions may be used, either alone or in combination with each other, either dissolved in, or suspended in, the projectile liquid aforesaid: Any chlorinated insecticide, e.g., dieldrin, aldrin, etc.; carbamate insecticides, e.g., 1, napthyl n-methyl-carbamate; any poly phosphate insecticide, e.g., DDVP, Dimethoate, etc.; and other contact insecticides, such as, pyrethrins I and II, hydrogenated rotenone and other related cube resins. The pyrethrins, as well as the derivatives of cube, which include rotenone, are well known to have the property of inducing paralysis in insects. When the insecticides are not soluble in the liquid compositions, suitable insecticidal solvents, which are compatible with the liquid composition, may be used, such as pine oil, citrus oil, etheral oils, camphor oils, and other terpenes well known to those skilled in the art.

For use with internally energized pressure systems, an appropriate low boiling liquid of the character generally used as the propellant in "aerosol bombs" may be used in an amount appropriate to generate and maintain the desired pressure in the container, which amount is hereinafter termed "q.v." This is preferably on the order of thirty to forty pounds per square inch. Because the manufacturer controls not only the equipment, but also the propelling pressure in internally energized devices, coincidence of stream range with evaporation range may be readily approximated. In the following examples, the propellant is dichloro difluoromethane in an amount sufficient to generate and maintain a pressure of 30 p.s.i., but other propellants and other pressures may be substituted.

The greater the area of the orifice through which the liquid is released at a given pressure, the greater the tendency of the emitted stream to flare or scatter. Nozzle bores shorter than about one inch tend to shorten the stream range; nozzle bores longer than about an inch and a half tend to shorten the evaporation range, at a propelling pressure of thirty pounds per square inch, but by appropriately coordinating the propelling pressure, the nozzle bore length, and the orifice area, satisfactory results can be achieved with wide variation.

To achieve the desired stream range, it is also preferable to equip the container with a nozzle of a type such that flare, scatter and atomization of the projectile stream is minimized until at or near the evaporation range of the liquid. A nozzle which has served well is one having a cylindrical bore 0.080 inch in diameter and 1¼ inches long. Such a nozzle was used on a container maintained at a pressure of about 30 p.s.i. at an ambient temperature of about 70°–80° F. to obtain the results indicated in the following examples, which illustrate how substantially coincident stream and evaporation ranges can be achieved by variation of the vaporization deterrents and other components, with the same propellant.

EXAMPLE A

This example is a specific exemplification of the liquid composition in combination with an insecticide, and produces both a stream range with an evaporation range (under the conditions aforesaid) of 4 to 6 feet nearly vertical from the nozzle.

| | Percent |
|---|---|
| Methylene chloride | 16.00 |
| Perchloro ethylene | 32.00 |
| Trichloro monofluoromethane | 15.20 |
| Pyrethrins I and II | .05 |
| Hydrogenated rotenone and other related cube resins | .40 |
| Dichloro difluoromethane | 20.00 |
| Pine oil | 2.80 |
| Kerosene | 13.55 |
| | 100.00 |

The percentages indicated are by weight.

EXAMPLE B

For a stream range and evaporation range of from 4 to 6 feet from nozzle without addition of contact insecticidal agents:

| | Percent |
|---|---|
| Dichloro difluoro methane | 20 |
| Perchloro ethylene | 34 |
| Trichloro monofluoromethane | 16 |
| Methylene chloride | 16 |
| Kerosene | 14 |

The percentages indicated are by weight.

EXAMPLE C

For stream and evaporation ranges of 6 to 10 feet from nozzle:

| | Percent |
|---|---|
| Dichloro difluoromethane | 30 |
| Trichlorotrifluoroethane | 60 |
| Kerosene | 10 |

The percentages indicated are by weight.

D

For an evaporation range of about twelve to fifteen feet:

| | |
|---|---|
| Methylene chloride | percent 50 |
| Perchloroethylene | do 50 |
| Propellant | q.v. |

E

For an evaporation range of eight to ten feet:

| | |
|---|---|
| Methylene chloride | percent 50 |
| Perchloroethylene | do 25 |
| 1,1,1 trichloroethane | do 25 |
| Propellant | q.v. |

F

For an evaporation range of about fifteen to twenty feet:

| | |
|---|---|
| Carbon tetrachloride | percent 20 |
| Perchloroethylene | do 20 |
| Methylene chloride | do 20 |
| Trichloromonofluoromethane | do 20 |
| Kerosene | do 20 |
| Propellant | q.v. |

G

For an evaporation range of about twenty feet:

| | |
|---|---|
| Methylene chloride | percent 100 |
| Propellant | q.v. |

H

For an evaporation range of ten feet:

| | |
|---|---|
| Trichlorotrifluoroethane | percent 100 |
| Propellant | q.v. |

The percentages indicated in Examples D through H are by weight. The evaporation ranges given are for ambient temperatures of about 70° F. and will be longer at lower temperatures, and shorter at higher ambient temperatures. The ranges are stated for a trajectory at about 45° to the horizontal with no wind. That the evaporation range may be longer than the stream range may reduce the effect on insects in flight at less than evaporation range, but does not reduce it on nests or static insects. To any and all of the foregoing examples compatible contact insecticides may be added, if desired.

The several Examples A, B, C, F and H are compounded with the view of safe use about energized electric power lines and equipment where there existed greater need for protection of workmen from the sting of flying insects, such as wasps, hornets and yellow jackets. Consequently, the specific comopsition stated in those examples have dielectric properties within safe limits. Obviously, in the absence of the dielectric requirements, many other liquids could be employed. Accordingly, many changes in and various modifications of the compositions and ingredients above disclosed may be made without departing from the spirit of the invention or sacrificing its advantages.

Having thus described the invention, what is claimed and desired to be secured by Letters Patent is:

1. A method of immobilizing insects comprising releasing a stream of fluid from a container where said fluid is confined under pressure sufficient to propel the liquid a distance of at least about four feet, at least part of said fluid being a liquid in the container but at least partially vaporizing at atmospheric pressure and a temperature of about 50° F. or lower, said liquid consisting essentially of a component having a boiling point at atmospheric pressure below the ambient temperature and a mutually soluble evaporation deterrent, and striking an insect with said stream while at least a part thereof is still liquid, whereby said liquid upon wetting the insect vaporizes and chills the insect until substantially immobile.

2. The process of claim 1 wherein said pressure is from about 30 to about 40 p.s.i.g.

3. The process of claim 1 wherein the fluid contains an insecticide.

4. The process of claim 1 wherein the fluid has the following approximate composition:

| | Percent |
|---|---|
| Methylene chloride | 16 |
| Perchloroethylene | 32 |
| Trichloro monofluoromethane | 15 |
| Pyrethrins I and II | 0.05 |
| Cube resins containing hydrogenated rotenone | 0.4 |
| Dichloro difluoromethane | 20 |
| Pine oil | 2.8 |
| Kerosene | 13.5 | and totalling about 100%.

References Cited

UNITED STATES PATENTS

| | | | |
|---|---|---|---|
| 1,892,750 | 1/1933 | Rotheim | 107—39 |
| 2,070,167 | 2/1937 | Iddings | 107—39 |
| 3,621,014 | 12/1952 | Efford | 107—39 |
| 2,964,165 | 12/1960 | Riley | 107—39 |
| 2,995,278 | 8/1961 | Clapp | 107—39 |
| 3,014,844 | 12/1961 | Thiel | 167—82 |
| 3,239,412 | 3/1966 | Sesso | 167—39 |

FRANK CACCIAPAGLIA, JR., *Primary Examiner.*

S. J. FRIEDMAN, *Assistant Examiner.*

U.S. Cl. X.R.

424—194

UNITED STATES PATENT OFFICE
CERTIFICATE OF CORRECTION

Patent No. 3,446,892                                                                 May 27, 1969

Daniel M. Stout

It is certified that error appears in the above identified patent and that said Letters Patent are hereby corrected as shown below:

Column 1, line 45, "immozilization" should read -- immobilization --. Column 3, line 33, "combinations" should read -- combination --. Column 5, line 33, after "of" insert -- about --; line 53, "comopsition" should read -- composition --. Column 6, line 43, "3,621,014" should read -- 2,621,014 --.

Signed and sealed this 14th day of April 1970.

(SEAL)
Attest:

Edward M. Fletcher, Jr.                                WILLIAM E. SCHUYLER, JR.
Attesting Officer                                                 Commissioner of Patents